United States Patent Office 3,478,050
Patented Nov. 11, 1969

3,478,050
1-(3',4'-METHYLENEDIOXY-PHENYL)-2-
PYRROLIDINO-ALKANONES-(1)
Herbert Köppe, Ingelheim (Rhine), Gerhard Ludwig,
Wedel, Holstein, and Karl Zeile, Ingelheim (Rhine),
Germany, assignors to Boehringer Ingelheim G.m.b.H.,
Ingelheim (Rhine), Germany, a corporation of Germany
No Drawing. Filed Apr. 29, 1966, Ser. No. 546,197
Claims priority, application Germany, May 28, 1965,
B 82,155
Int. Cl. C07d 95/00, 27/04; A61k 27/00
U.S. Cl. 260—326.5                        6 Claims

ABSTRACT OF THE DISCLOSURE

The compounds are 1-(3',4'-methylenedioxy-phenyl)-2-heterocyclic amino-alkanones-(1) and non-toxic acid addition salts thereof, useful as central nervous system stimulants in warm-blooded animals.

This invention relates to a novel class of α-aminoketones having a heterocyclic amino group, and acid addition salts thereof.

More particularly, the present invention relates to α-heterocyclic amino-substituted 3,4-methylenedioxyphenyl-alkanones of the formula

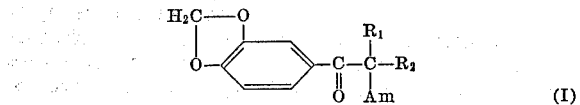
(I)

wherein $R_1$ is hydrogen or alkyl of 1 to 4 carbon atoms, $R_2$ is straight or branched alkyl of 1 to 6 carbon atoms, and Am is an unsubstituted or lower alkyl-substituted pyrrolidino or morpholino group; and non-toxic, pharmacologically acceptable acid addition salts thereof.

The compounds according to the instant invention may be prepared by a number of methods involving known chemical reaction principles, among which the following have been found to be most convenient and efficient:

METHOD A

By reacting an α-halo-3,4-methylenedioxyphenylalkanone of the formula

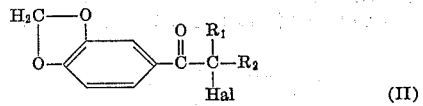
(II)

wherein $R_1$ and $R_2$ have the same meanings as in Formula I, and Hal is halogen, with a heterocyclic amine of the formula

(IIIa)

or

(IIIb)

wherein $R_3$ is lower alkyl or hydrogen.

The reaction is advantageously carried out at a temperature below 100° C. in the presence of an inert organic solvent, such as ethanol, ether, chloroform or benzene. It is preferred to employ a stoichiometric excess of the heterocyclic amine IIIa or IIIb and/or to add an acid-binding agent, such as pyridine, an alkali metal carbonate or alkali metal bicarbonate, to the reaction mixture. By "acid-binding agent" we mean an agent capable of tying up or neutralizing the hydrohalic acid released by the reaction. The reaction mixture is worked up in customary fashion; for instance, by evaporating it, dissolving the residue in ether, and precipitating the reaction product in the form of the hydrochloride addition salt.

METHOD B

By reacting a nitrile of the formula

(IV)

wherein $R_1$, $R_2$ and Am have the same meanings as in Formula I, with methylenedioxybenzene, preferably in the presence of a Friedel-Crafts catalyst, such as aluminum chloride, and subsequently hydrolyzing the ketimine intermediate formed by the reaction between the nitrile and the methylenedioxybenzene. The reaction may be carried out in the presence of a suitable inert solvent, such as nitrobenzene. If aluminum chloride is used as a catalyst, the reaction proceeds at moderately elevated temperatures while introducing hydrogen chloride into the reaction mixture.

METHOD C

By reacting an acid amide or nitrile of the formula

(V)

wherein $R_1$, $R_2$ and Am have the same meanings as in Formula I and Z represents a carboxamide group or a cyano group, with a 3,4-methylenedioxyphenyl-magnesium halide of the formula

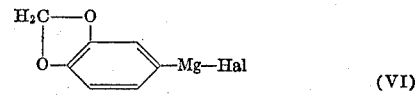
(VI)

wherein Hal is halogen. The reaction is preferably carried out in the presence of an inert organic solvent, such as ether, tetrahydrofuran or a mixture of tetrahydrofuran and benzene, under anhydrous conditions and, if necessary, under exclusion of oxygen and elevated temperatures. The organometal intermediate formed thereby is subsequently decomposed by hydrolysis.

Method D

By oxidizing a 3,4-methylenedioxyphenyl-aminoalkanol of the formula

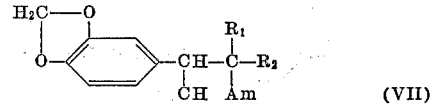
(VII)

wherein $R_1$, $R_2$ and Am have the same meanings as in formula I, with a strong oxidizing agent, such as chromic acid or an alkali metal dichromate. The oxidation reaction will proceed at room temperature or moderately elevated temperatures and is advantageously carried out in an aqueous medium at an acid pH value.

Method E

By reacting an epoxyether of the formula

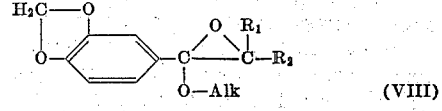
(VIII)

wherein $R_1$ and $R_2$ have the same meanings as in formula I and Alk is alkyl of 1 to 4 carbon atoms, with a heterocyclic amine of the formula IIIa or IIIb above. The epoxyethers VIII may be obtained by reacting an α-halo-3,4-methylenedioxyphenyl-alkanone of the formula II above with an alkali metal alcoholate.

The compounds according to the present invention have at least one optically active center, wherefor they occur as racemic mixtures of optically active antipodes. The racemates may be separated into their optically active antipode components by customary methods, such as by fractional crystallization of the dibenzoyltartaric acid addition salts.

The compounds embraced by formula I above are basic in character and therefore form non-toxic, pharmacologically acid addition salts with inorganic or organic acids. Examples of non-toxic acid addition salts include, but are not limited to, those formed with hydrochloric acid, hydrobromic acid, sulfuric acid, phosphoric acid, tartaric acid, maleic acid, sulfamic acid, 8-chloro-theophylline and the like.

The following examples further illustrate the present invention and will enable others skilled in the art to understand it more completely.

EXAMPLE 1

Preparation of 1-(3',4'-methylenedioxy-phenyl)-2-pyrrolidino-4-methyl-pentanone-(1) and its hydrochloride by Method A 22.1 gm. of 1-(3',4'-methylenedioxy-phenyl)-4-methyl-pentanone-(1) were dissolved in 100 cc. of absolute benzene, a solution of 5.1 cc. of bromine in 15 cc. of absolute benzene was added, and the mixture was allowed to stand for a short period of time at room temperature. Thereafter, hydrogen bromide and the solvent were distilled off in vacuo, leaving 31.3 gm. of a residue consisting of 1-(3',4'-methylenedioxy-phenyl)-2-bromo-4-methyl - pentanone-(1). The residue was dissolved in 100 cc. of absolute benzene, 40 cc. of ether were added to the solution, the ethereal mixture was admixed with 12 gm. of pyrrolidine, and the resulting reaction mixture was allowed to stand for five hours at 50° C. Thereafter, the reaction mixture was shaken with water, and the organic phase was separated, dried over sodium sulfate and evaporated to dryness. The residue, 1-(3',4'-methylenedoxy-phenyl)-2-pyrrolidino-4-methyl-pentanone-(1), was taken up in a small amount of absolute ethanol, and the solution was acidified with ethereal hydrochloric acid. The precipitate formed thereby was separated by vacuum filtration, recrystallized from a mixture of a compound having a melting point of 236–238° C. were obtained; it was identified to be 1–3',4'-methylene-dioxy-phenyl)-2-pyrrolidino - 4 - methyl-pentanone-(1) hydrochloride of the formula

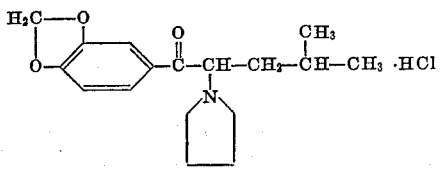

EXAMPLE 2

Preparation of 1-(3',4'-methylenedioxy-phenyl)-2-pyrolidino-2-methyl-propanone-(1) and its hydrochloride by Method E 13.2 gm. of 1-(3',4'-methylenedioxy-phenyl)-2-bromo-2-methyl-propanone-(1) were dissolved in 20 cc. of absolute methanol, the solution was admixed with a methanolic sodium methylate solution prepared by dissolving 1.15 gm. of sodium in 30 cc. of methanol, and the mixture was refluxed for one hour. Thereafter, the reaction mixture was admixed with 300 cc. of water, and the aqueous solution was extracted several times with ether. The ether extract solutions were combined, washed with washed water, dried over sodium sulfate, filtered, and the filtrate was evaporated to dryness. The residue, 1-(3',4'-methylenedioxy - phenyl)-1,2-epoxy - 1 - methoxy-2-methyl-propane, was admixed with 6 gm. of pyrrolidine, and the mixture was refluxed for 17 hours. Thereafter, the reaction mixture was evaporated in vacuo, and the residue was distilled, yielding a liquid having a boiling point of 150° C. at 0.015 mm. Hg. which was identified to be 1-(3',4'-methylenedioxy-phenyl)-2-pyrrolidino-2-methyl-propanone. This product was dissolved in absolute ethanol, the solution was acidified with ethereal hydrochloric acid, and the crystalline precipitate formed thereby was separated by vacuum filtration and recrystallized from a mixture of ethanol and ether, yielding 1-(3',4'-methylenedioxy - phenyl) - 2 - pyrrolidino - 2 - methyl-propanone-(1) hydrochloride, M.P. 188–190° C., of the formula

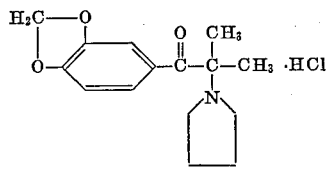

EXAMPLE 3

Preparation of 1-(3',4'-methylenedioxy-phenyl)-2-pyrrolidino-butanone-(1) and its hydrochloride by Method A 27.1 gm. (0.1 mol) of 1-(3',4'-methylenedioxy-phenyl)-2-bromo-butanone(1) were dissolved in 100 cc. of absolute benzene, and 14.2 gm. (0.2 mol) of pyrrolidine were added to the solution. After the initially exothermic solution had subsided, the reaction mixture was allowed to stand for twelve hours at 20° C. and was then refluxed for two hours. Thereafter, the reaction mixture was allowed to cool, was then admixed with 200 cc. of ether, the ethereal solution was washed several times with water, the ethereal phase was dried with magnesium sulfate, and the ether was distilled off, leaving 1-(3',4'-methylenedioxy-phenyl)-2-pyrrolidino-butanone-(1) as a residue. The residue was dissolved in absolute ethanol, the solution was acidified with ethereal hydrochloric acid, and a small amount of ether was added. The crystalline product which separated out was recrystallized from a mixture of ethanol and ether, yielding 17.2 gm. of a substance having a melting point of 227–228° C. It was identified to be 1-(3',4'-methylenedioxy-phenyl)-2-pyrrolidino-butanone - (1) hydrochloride of the formula

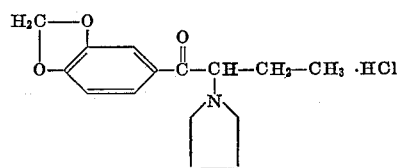

EXAMPLE 4

Preparation of 1-(3',4'-methylenedioxy-phenyl)-2-pyrrolidino-hexanone-(1) and its hydrochloride by Method A 48.3 gm. of 1-(3',4'-methylenedioxy-phenyl)-2-bromo-hexanone-(1) were dissolved in a mixture of 150 cc. of absolute benzene and 75 cc. of absolute ether, and the resulting solution was admixed with 22.4 gm. of pyrrolidine.

The reaction mixture was heated for thirty hours at 50° C. and was thereafter allowed to cool. It was worked up as described in Example 3, except that the end product was recrystallized from a mixture of isopropanol and ether. 43.5 gm. of 1-(3',4'-methylenedioxy-phenyl)-2-pyrrolidino-hexanone-(1) hydrochloride, M.P. 205.5–207° C., of the formula

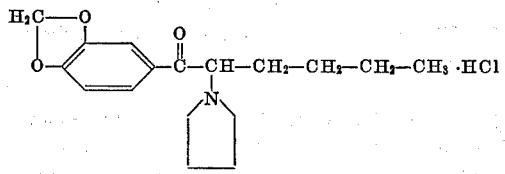

were obtained.

EXAMPLE 5

Preparation of 1-(3',4'-methylenedioxy-phenyl)-2-pyrrolidino-pentanone-(1) and its hydrochloride by Method A 29.1 gm. of 1-(3',4-methylenedioxy-phenyl)-2-bromo-pentanone-(1) were dissolved in a mixture of 90 cc. of absolute benzene and 100 cc. of absolute ether, 22 gm. of pyrrolidine were added to the resulting solution, and the mixture was heated for sixty hours at 40° C. Thereafter, the reaction mixture was worked up as described in Example 3, except that the end product was recrystallized from a mixture of isopropanol and ether. 23.2 gm. of 1-(3',4'-methylenedioxy-phenyl) - 2 - pyrrolidino - pentanone-(1) hydrochloride, M.P. 229–231° C., of the formula

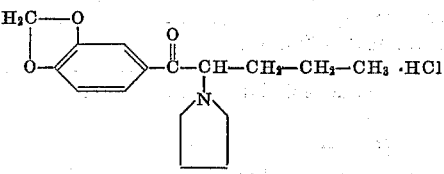

were obtained.

EXAMPLE 6

Using a procedure analogous to that described in Example 1, 1-(3',4'-methylenedioxy-phenyl)-2-pyrrolidino-acetone-(1) hydrochloride, M.P. 234–235° C., of the formula

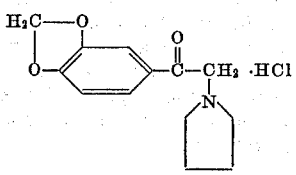

was prepared from 1-(3',4'-methylenedioxy-phenyl)-2-bromo-acetone and pyrrolidine.

EXAMPLE 7

Using a procedure analogous to that described in Example 3, 1-(3',4'-methylenedioxy-phenyl)-2-pyrrolidino-propanone-(1) hydrochloride, M.P. 242–243° C., of the formula

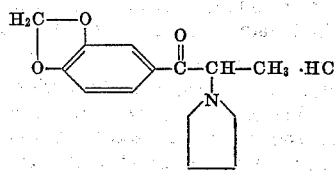

was prepared from 1-(3',4'-methylenedioxy-phenyl)-2-bromo-propanone-(1) and pyrrolidine.

EXAMPLE 8

Using a procedure analogous to that described in Example 1, 1-(3',4'-methylenedioxy-phenyl)-2-pyrrolidino-heptanone-(1) hydrochloride, M.P. 201.5–203.5° C., was prepared from 1-(3',4'-methylenedioxy-phenyl)-2-bromo-heptanone-(1) and pyrrolidine.

EXAMPLE 9

Using a procedure analogous to that described in Example 1, 1-(3',4'-methylenedioxy-phenyl)-2-pyrrolidino-octanone-(1) hydrochloride, M.P. 184.5–186° C., was prepared from 1-(3',4'-methylenedioxy-phenyl)-2-bromo-octanone(1) and pyrrolidine.

EXAMPLE 10

Using a procedure analogous to that described in Example 1, 1-(3',4'-methylenedioxy-phenyl)-2 - pyrrolidino-3,3-dimethyl-propanone-(1) hydrochloride, M.P. 266–267° C., of the formula

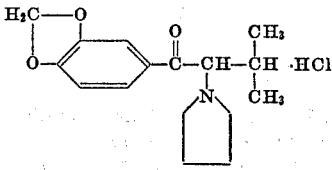

was prepared from 1-(3',4'-methylenedioxy-phenyl)-2-bromo-3,3-dimethyl-propanone-(1) and pyrrolidine.

EXAMPLE 11

Using a procedure analogous to that described in Example 1, 1-(3',4'-methylenedioxy-phenyl)-2-pyrrolidino-3-methyl-pentanone-(1) hydrobromide, M.P. 257–258° C., of the formula

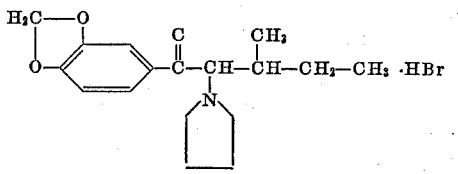

was prepared from 1-(3',4'-methylenedioxy-phenyl) -2-bromo-3-methyl-pentanone (1) and pyrrolidine. The etheral solution of the free base was acidified with hydrobromic acid in place of hydrochloric acid.

EXAMPLE 12

Using a procedure analgous to that described in Example 2, 1-(3',4' methylenedioxy phenyl)-2-pyrrolidino-2-methyl-pentanone-(1) hydrobromide, M.P. 151–152°

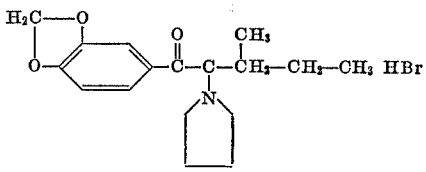

was prepared from 1-(3',4'-methylenedioxy-phenyl)-2-bromo - 2 - methyl-pentanone-(1), sodium methylate and pyrrolidine. The ethanolic solution of the free base was acidified with hydrobromic acid in place of hydrochloric acid.

EXAMPLE 13

Using a procedure analogous to that described in Example 2, 1-(3',4'-methylenedioxy-phenyl)-2-pyrrolidino-2-ethyl-butanone-(1) hydrobromide, M.P. 166–167° C., of the formula

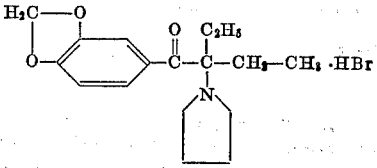

was prepared from 1-(3',4'-methylenedioxy-phenyl)-2-bromo-2-ethyl-butanone-(1), sodium methylate and pyrrolidine. The ethanolic solution of the free base was acidified with hydrabromic acid in place of hydrochloric acid.

EXAMPLE 14

Using a procedure analogous to that described in Example 1, 1-(3',4'-methylenedioxy-phenyl)-2-morpholinoacetone-(1) hydrochloride, M.P. 219–220° C., of the formula

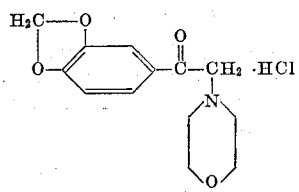

was prepared from 1-(3',4'-methylenedioxy-phenyl)-2-bromo-acetone-(1) and morpholine.

The compounds according to the present invention, that is, those embraced by Formula I above and their nontoxic, pharmacologically acceptable acid addition salts, have useful pharmacological purposes. More particularly, they exhibit extraordinarily powerful central nervous system stimulating activities in warm-blooded animals, while their toxicity is very low. Thus, their therapeutic ratio is very high and therefore unexpectedly favorable. In this respect the compounds of the invention are surprisingly superior to analogous compounds disclosed in German Patent No. 1,161,274 and British Patent 927,475.

For pharmaceutical purposes the compounds according to the present invention are administered to warm-blooded animals perorally or parenterally, preferably perorally, as active ingredients in dosage unit compositions, that is, compositions in dosage unit form consisting essentially of an inert pharmaceutical carrier and one dosage unit of the active ingredient, such as tablets, capsules, solutions, suspensions, syrup, wafers and the like. One dosage unit of the compounds according to the invention is from 2 to 40 mgm., preferably 10–20 mgm.

The following examples illustrate a few dosage unit compositions comprising a compound of the instant invention as an active ingredient. The parts are parts by weight unless otherwise specified.

EXAMPLE 15

Tablets

The tablet composition is compounded from the following ingredients:

| | Parts |
|---|---|
| 1-(3',4'-methylenedioxy-phenyl)-2-pyrrolidino-pentanone-(1)-hydrochloride | 15 |
| Calcium phosphate | 150 |
| Lactose, pulversized | 83 |
| Corn starch | 180 |
| Colloidal silicic acid | 15 |
| Magnesium stearate | 2 |
| Gelatin | 5 |
| Total | 450 |

Compounding procedure:

The pentanone compound, the lactose, and a portion of the corn starch and silicic acid are intimately admixed with each other, and the mixture is moistened with an aqueous 10% solution of the gelatin. The moist mass is forced through a 1.5 mm.-mesh screen, and the moist granulate thus obtained is dried for about twelve hours at 45° C. The dry granulate is then admixed with the remaining amount of corn starch and silicic acid as well as with the magnesium stearate, and the mixture is pressed into 450 mgm. tablets. Each tablet contains 15 mgm. of the active ingredient.

EXAMPLE 16

Gelatin capsules

The filler composition is compounded from the following ingredients:

| | Parts |
|---|---|
| 1-(3',4'-methylenedioxy-phenyl)-2-pyrrolidino-hexanone-(1) hydrochloride | 20 |
| Lactose | 79 |
| Magnesium stearate | 1 |
| Total | 100 |

Compounding procedure:

The individual ingredients are intimately admixed with each other, and 100 mgm. portions of the mixture are filled into gelatin capsules of suitable size. Each capsule contains 20 mgm. of the active ingredient.

EXAMPLE 17

Sustained-release tablets

The tablet composition is compounded from the following ingredients:

| | Parts |
|---|---|
| 1-(3',4'-methylenedioxy-phenyl)-2-pyrrolidino-heptanone-(1) | 20 |
| Carboxymethyl cellulose | 60 |
| Stearic acid | 4 |
| Cellulose acetate phthalate | 8 |
| Total | 92 |

Compounding procedure:

The heptanone compound, the carboxy methyl cellulose and the stearic acid are intimately admixed with each other, and the mixture is thoroughly kneaded with a solution of the cellulose acetate phthalate in 40 cc. of a mixture of 60% by volume of ethylacetate and 40% by volume of ethanol. The dough-like mass thus obtained is partially dried at about 50° C., forced through a 4 mm.-mesh screen, the resulting moist granulate is completely dried, and the dry granulate is again passed through the screen and then pressed into 92 mgm. pill cores. The pill cores are then coated with a thin sugar shell. Each coated tablet weighs approximately 150 mgm. and contains 20 mgm. of the active ingredient.

EXAMPLE 18

Hypodermic solution

The solution is compounded from the following ingredients:

| | Parts |
|---|---|
| 1-(3',4'-methylenedioxy-phenyl)-2-pyrrolidino-butanone-(1) hydrochloride | 10 |
| Disodium salt of EDTA | 1 |
| Double-distilled water, q.s. ad (by vol.) | 1000 |

Compounding procedure:

The butanone compound and the EDTA salt are dissolved in the distilled water, the solution is filtered until free from suspended particles, and the filtrate is filled into white 2 cc.-ampules which are then sterilized and sealed. Each ampule contains 20 mgm. of the active ingredient.

Although the above dosage unit composition examples illustrate only a selected few of the compounds of the instant invention as active ingredients, it should be understood that any of the other compounds embraced by Formula I or their non-toxic, pharmacologically acceptable acid addition salts may be substituted for the particular active ingredients in Examples 15 through 18. Moreover, the amounts of active ingredient in these examples may be varied within the dosage unit limits set forth above, and the amounts and nature of the inert pharmaceutical ingredients may be varied to meet particular requirements.

We claim:
1. A compound of the formula

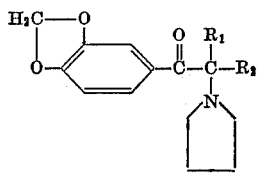

wherein
$R_1$ is hydrogen, methyl or ethyl, and
$R_2$ is alkyl of 1 to 4 carbon atoms,
or a non-toxic, pharmacologically acceptable acid addition salt thereof.

2. 1-(3',4'-methylenedioxy-phenyl) - 2 - pyrrolidino-butanone-(1) hydrochloride.

3. 1-(3',4'-methylenedioxy-phenyl) - 2 - pyrrolidino-hexanone-(1) hydrochloride.

4. 1-(3',4'-methylenedioxy-phenyl) - 2 - pyrrolidino-pentanone-(1) hydrochloride.

5. 1-(3',4'-methylenedioxy-phenyl) - 2 - pyrrolidino-heptanone-(1) hydrochloride.

6. 1-(3',4'-methylenedioxy-phenyl) - 2 - pyrrolidino-3,3-dimethyl-propanone-(1) hydrochloride.

References Cited
UNITED STATES PATENTS
3,314,970   4/1967   Seeger _____ 260—326.5

ALEX MAZEL, Primary Examiner
JOSE TOVAR, Assistant Examiner

U.S. Cl. X.R.
260—247.1, 247.7, 256, 326.3; 424—248, 274

PO-1050
(5/69)

UNITED STATES PATENT OFFICE
CERTIFICATE OF CORRECTION

Patent No. 3,478,050          Dated November 11, 1969

Inventor(s) HERBERT KÖPPE ET AL

It is certified that error appears in the above-identified patent and that said Letters Patent are hereby corrected as shown below:

Col. 2, line 55   $\overset{|}{C}H \ \overset{|}{A}m$    should be -- $\overset{|}{O}H \ \overset{|}{A}m$ --

Col. 3, line 49   After "mixture" insert -- of ethanol and ether and dried. 23 gm (71% of theory) --

Col. 6, 2nd formula   " $\overset{C}{\underset{C}{\|}}$ " should be -- $\overset{O}{\underset{C}{\|}}$ --

Col. 6, 3rd formula   " $\overset{O}{\underset{C-C-CH_2}{\|}} \overset{CH_3}{|} \atop \underset{N}{|}$ " should be -- $\overset{O}{\underset{C-C-Cl}{\|}} \overset{CH_3}{|} \atop \underset{N}{|}$ --

SIGNED AND
SEALED
MAY 12 1970

(SEAL)
Attest:

Edward M. Fletcher, Jr.
Attesting Officer

WILLIAM E. SCHUYLER, JR
Commissioner of Patents